United States Patent [19]
Cebalo

[11] 3,899,505
[45] Aug. 12, 1975

[54] METHOD OF PRODUCING 1,3,4-THIADIAZOL-2-YLUREAS

[75] Inventor: Tony Cebalo, Allentown, Pa.

[73] Assignee: Air Products and Chemicals, Inc., Allentown, Pa.

[22] Filed: Jan. 19, 1970

[21] Appl. No.: 4,075

[52] U.S. Cl.............. 260/306.8 D; 71/90; 260/999
[51] Int. Cl. .....................................C07d 91/62
[58] Field of Search............................ 260/306.8 D

[56] References Cited
UNITED STATES PATENTS
3,565,901    2/1971    Cebalo............................ 260/306.8

Primary Examiner—Richard J. Gallagher
Attorney, Agent, or Firm—Leroy Whitaker

[57] ABSTRACT

Certain 2-alkylamino-1,3,4-thiadiazole compounds are reacted with N,N-dialkylcarbamoyl chlorides in the presence of sodium metalating agents to provide fully substituted 1,3,4-thiadiazol-2-ylurea compounds.

6 Claims, No Drawings

METHOD OF PRODUCING 1,3,4-THIADIAZOL-2-YLUREAS

BACKGROUND OF THE INVENTION

It is generally known in the art to react N,N-dialkylcarbamoyl chlorides with amines in the presence of an acid acceptor (e.g. triethylamine, pyridine, potassium carbonate, etc.) to produce urea compounds. However, such reactions do not provide the desirable urea compounds produced by the method of the invention since the 2-alkylamino-1,3,4-thiadiazole intermediates required to give the urea product of the invention are unreactive in such reactions. Furthermore, it is known that certain preformed metal derivatives of amines (e.g. sodium, potassium, lithium, etc.) will react with N,N-dialkylcarbamoyl chlorides to produce urea compounds. However, this reaction will only work for certain 2-alkylamino-1,3,4-thiadiazole intermediates while for others extremely poor or no yields of the desired urea products are obtained.

SUMMARY OF THE INVENTION

The present invention is directed to a method for producing 1,3,4-thiadiazol-2-ylurea compounds having the general structure:

(I)

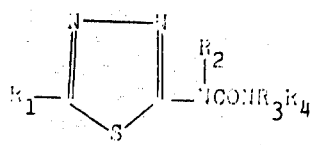

wherein
R$_1$ is a lower alkyl radical having from 1 to 4 carbon atoms, a fluoroalkyl radical having from 1 to 4 carbon atoms, and
R$_2$, R$_3$ and R$_4$ are lower alkyl radicals having from 1 to 4 carbon atoms
which comprises reacting a 2-alkylamino-1,3,4-thiadiazole compound with an N,N-dialkylcarbamoyl chloride compound in the presence of a sodium metalating agent to obtain a 1,3,4-thiadiazol-2-ylurea compound.

PREFERRED EMBODIMENTS OF THE INVENTION

The method of the invention may be represented by the following general reaction:

(II)

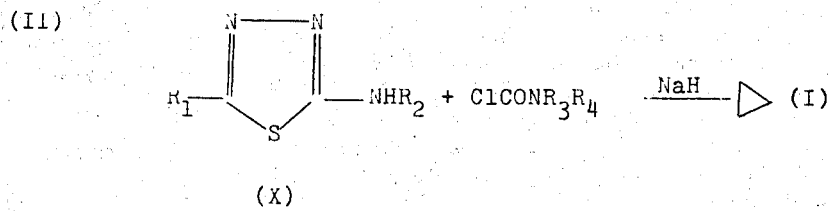

The definition of R$_1$, R$_2$, R$_3$ and R$_4$ are as hereinbefore defined.

The 2-alkylamino-1,3,4-thiadiazole compounds (X) employed in (II) above may be produced by methods generally known in the art. Examples of such methods are as follows:

(1) 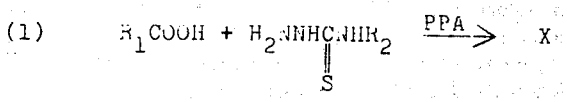

The above reaction uses polyphosphoric acid (PPA) as a dehydrating agent.

(2) a. 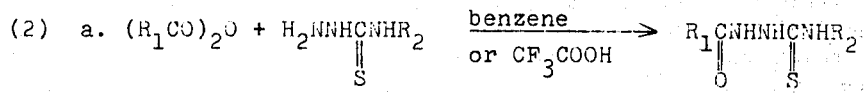

b. 

c. 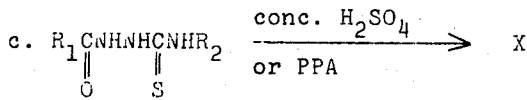

(3) 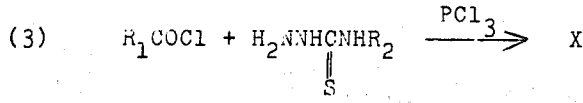

In each of the equations (1), (2) and (3), R$_1$ and R$_2$ are as defined above. Any of the above methods will yield the compound (X). For given substituents R$_1$ and R$_2$, each of the above methods will give a different yield. Selection of the preferred method, consequently, is an emperical decision based on experience with given substituents. Choice of method will be obvious to those skilled in the art, having the above disclosure before them.

The compound of structure (X) is reacted with an N,N-dialkylcarbamoyl chloride, in an inert solvent, with the aid of sodium metalating agents. It is essential to the method of the invention that the sodium metalating agent be added very slowly to the reaction mixture containing the compound of structure (X) and the N,N-dialkylcarbamoyl chloride. Such slow addition provides for controlled formation of the sodium derivative of the 2-alkylamino-1,3,4-thiadiazole which in turn reacts with the N,N-dialkylcarbamoyl chloride to produce the desired 1,3,4-thiadiazol-2-ylurea compounds. Slow addition of the metalating agents eliminates the presence of a large excess of the sodium derivative which in turn readily decomposes. This presence of a large excess of the sodium derivative causes a considerable decrease in the yield of the desired product and in some cases no yield at all is obtained.

The N,N-dialkylcarbamoyl chlorides that may be employed in the method of the invention include N,N-dimethylcarbamoyl chloride; N-methyl-N-propylcarbamoyl chloride; N-methyl-N-isopropylcarbamoyl chloride; N-methyl-N-butylcarbamoyl chloride; N,N-dipropylcarbamoyl chloride and the like. Molar equivalents, or a slight excess of the carbamoyl chlorides, and 2-alkylamino-1,3,4 thiadiazole are used in the process.

Metalating agents which may be employed in the invention include sodium metal, sodium hydride and the like. Molar equivalents of metalating agent and 2-alkylamino-1,3,4-thiadiazole are used in the process. The metalating agents employed react with the 2-alkylamino-1,3,4-thiadiazoles wherein the amino hydrogen is replaced by the metal ion. Solvents suitable for use in the method include inert solvents used for metalation reactions, for example, N,N-dimethylformamide and tetrahydrofuran.

The reaction generally provides desirable products when conducted in a temperature range of from about −5°C to +15°C and preferably from about 0°C to about +5°C.

The method of the invention is particularly suited for preparing 1,3,4-thiadiazol-2-ylurea compounds having desirable biological activity, i.e., for us as herbicides, insecticides, fungicides, etc.

The following examples are illustrative of the invention and are not intended to limit the scope thereof.

EXAMPLE 1

Into a three-necked round bottom flask equipped with a magnetic stirrer and through which a slow stream of nitrogen was introduced, was added 100 ml of anhydrous N,N-dimethylformamide, 4.6 gms of N,N-dimethylcarbamoyl chloride and 10 gms of 2-methylamino-5-pentafluoroethyl-1,3,4-thiadiazole. The reaction mixture was cooled to 0°C and 1.8 gms of a 57 percent suspension in oil of sodium hydride were added over a period of 2 hours while the reaction temperature was maintained at 0°C to 5°C. The mixture was stirred at room temperature for about 2 hours, poured into 200 ml of water and the oil which separated was extracted with ethyl acetate and the ethyl acetate concentrated under vacuum to yield an oil product (10 g) which was washed with petroleum ether. The residue was identified to be 1,1,3-trimethyl-3-(5-pentafluoroethyl-1,3,4-thiadiazol-2-yl)urea.

EXAMPLE 2

Into a three-necked round bottom flask, equipped with a magnetic stirrer and through which a slow stream of nitrogen was passed, was added 150 ml of anhydrous N,N-dimethylformamide, 15 g of 5-difluoromethyl-2-methylamino-1,3,4-thiadiazole and 9.8 g of N,N-dimethylcarbamoyl chloride. The reaction mixture was cooled to 0°C and 3.83 g of a 57 percent suspension in oil of sodium hydride added over a period of 2 hours while the reaction temperature was kept at 0°C to 5°C. The reaction mixture was then stirred at room temperature for 3 hours and poured into an ice-water mixture. The precipitate which settled was filtered and taken up in 100 ml of ethyl acetate. The ethylacetate was washed with water, dried over anhydrous sodium sulfate, and concentrated under vacuum to give 11 g of a product identified to be 1,1,3-trimethyl-3-(5-difluoromethyl-1,3,4-thiadiazol-2-yl)urea.

EXAMPLE 3

To a mixture containing 21 gms of 2-methylamino-5-tert. butyl-1,3,4-thiadiazole and 13.2 gms of N,N-dimethylcarbamoyl chloride in 150 mls of anhydrous dimethylformamide, which was kept under an atmosphere of nitrogen and cooled to 5°C, was added sodium hydride (5.2 g of a 57 percent suspension in oil) portionwise over a period of one hour while the reaction temperature was maintained at ca. 5°C. The reaction was stirred at room temperature for 12 hours, poured into water and the mixture extracted with ethyl acetate. The ethyl acetate extract was dried over anhydrous sodium sulfate and then concentrated to yield an oil which was washed with petroleum ether. The product (24 gms) was identified to be 1,1,3-trimethyl-3-(5-tert. butyl-1,3,4-thiadiazol-2-yl)urea.

What is claimed is:

1. A method for producing 1,3,4-thiadiazol-2-ylurea compounds having the general structure:

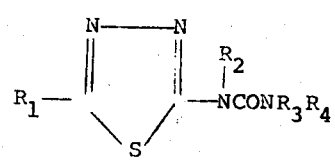

wherein
  $R_1$ is a lower alkyl radical having from 1 to 4 carbon atoms, a fluoroalkyl radical having from 1 to 4 carbon atoms, and $R_2$, $R_3$ and $R_4$ are lower alkyl radicals having from 1 to 4 carbon atoms, which comprises reacting a 2-alkylamino-1,3,4-thiadiazole compound with an N,N-dialkylcarbamoyl chloride compound in the presence of a sodium metalating agent, the reaction being conducted at a temperature in the range of from about −5°C to about +15°C.

2. The method of claim 1 wherein the N,N-dialkylcarbamoyl chloride compound is N,N-dimethylcarbamoyl chloride.

3. The method of claim 1 wherein the sodium metalating agent is sodium hydride.

4. The method of claim 1 wherein $R_1$ is pentafluoroethyl, and $R_2$, $R_3$ and $R_4$ are methyl.

5. The method of claim 1 wherein $R_1$ is difluoromethyl and $R_2$, $R_3$ and $R_4$ are methyl.

6. The method of claim 1 wherein $R_1$ is tertiary-butyl and $R_2$, $R_3$ and $R_4$ are methyl.

* * * * *